June 14, 1932. S. WIDMER 1,863,293
ELECTRIC CURRENT RECTIFYING CONTROL SYSTEM
Filed May 3, 1930
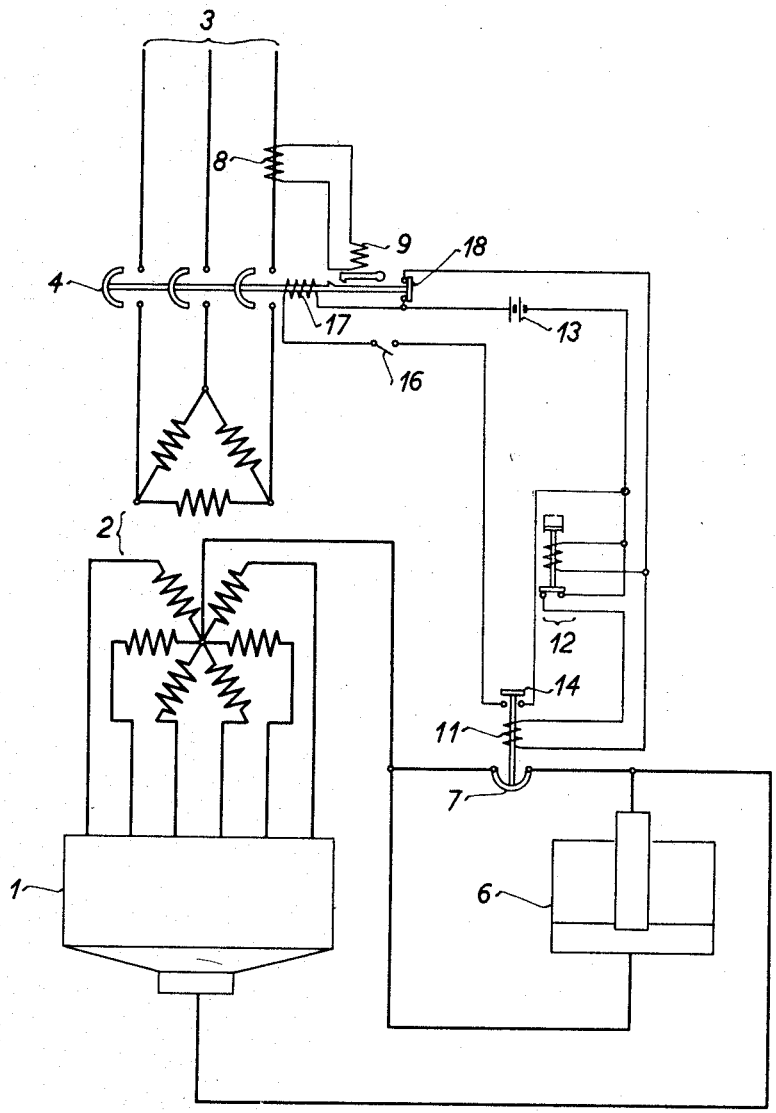
Inventor
Stefan Widmer
By [signature]
Attorney Patented June 14, 1932

1,863,293

UNITED STATES PATENT OFFICE

STEFAN WIDMER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRIC CURRENT RECTIFYING CONTROL SYSTEM

Application filed May 3, 1930, Serial No. 449,666, and in Germany May 21, 1929.

This invention relates to improvements in electric current rectifying systems and, particularly, to systems for suppressing backfires in electric current rectifiers used to supply direct current consuming devices of such character as produce a back E. M. F. even after disconnection of the supply voltage.

Power current rectifiers of output capacities up to 16,000 amperes are frequently used to operate aluminum producing furnaces or to perform electrolytic operations. If a backfire now occurs in a rectifier, the rectifier is disconnected in a well-known manner by a maximum current relay and the backfire or short circuit between the anodes is broken. The backfire in the rectifier is, however, not quenched immediately because the backfiring arc between the cathode and the backfiring anode is maintained by the electrolytic operation or the electric furnace until a switch in the direct current circuit breaks the reverse current. Electrolytic operations, as well as electric furnaces, such for example as aluminum-producing furnaces, have, even when the supply voltage is disconnected, a sufficiently large back E. M. F. to maintain a material backfiring or reverse current in the rectifier. A considerable time, even as much as a half hour, may elapse before such E. M. F. has dropped to the value which does not exceed the arc drop in the rectifier. During this time the arc may naturally cause considerable disturbance and may even cause destruction of the rectifier. A switch must accordingly be provided in the direct current which will immediately break this current circuit upon occurrence of a backfire in order to avoid the continuance of the backfiring arc. Such switch, however, for the large currents to be controlled, in electrolytic operations or electric furnace operations is quite large and expensive.

It is, therefore, among the objects of the present invention to provide a system for protecting rectifiers supplying electrolytic or electric furnace operations in which, after disconnection of the supply voltage, the back E. M. F. produced by the consuming device is instantaneously short-circuited.

Objects and advantages, other than those above set forth, will be apparent from the following description and the drawing which diagrammatically illustrates a system arranged according to the present invention which may be divided generally into a power circuit and a control circuit.

Referring more particularly to the drawing by characters of reference, reference numeral 1 indicates a rectifier of the metallic vapor type supplied by means of a transformer 2 which is connected to a source of alternating current 3 through a circuit breaker 4. The direct current produced by the rectifier is consumed in a direct current consuming device 6, such as an electrolytic cell or electric furnace, connected with the neutral point of the transformer secondary winding and the cathode of the rectifier to form the direct current work circuit. The furnace 6 may be short-circuited by closing a short-circuiting switch 7 which is interconnected with the circuit breaker 4 so that the switch 7 and the circuit breaker 4 may be operated or closed and opened respectively only under predetermined conditions in the above power circuit of the system as will be described.

The control circuit of the system includes a current transformer 8 connected with the alternating current source 3 for the purpose of energizing the maximum current release coil 9 which releases the latch of the circuit breaker 4 thereby permitting the circuit breaker 4 to open. The short-circuiting switch 7 is operable through the action of a closing coil 11 which is supplied from an auxiliary source of current 13. The switch 7 is provided with a time delay device 12 and a contact member 14 for the purpose of bridging a pair of contacts connected with a control switch 16 and a circuit breaker closing coil 17 through the source of current 13. The circuit breaker 4 is provided with an auxiliary contact member 18 controlling the current circuit to the coil 11 of the switch 7.

In operation, when for any reason a backfire occurs in the rectifier 1, the current transformer 8 energizes the releasing coil 9, thereby permitting the circuit breaker 4 to open. The contact member 18 of the circuit breaker thereupon bridges the contacts in the circuit of the coil 11 with the current source 13 to energize the coil and close the short-circuiting switch 7. The back E. M. F. of the furnace 6 immediately breaks down so that the reverse current from the furnace through the rectifier 1 ceases. As long as the switch 7 is closed, the circuit breaker 4 cannot again be closed by operation of the circuit breaker closing switch 16 to energize the closing coil 17 because the circuit is broken as the contact member 14 of the short-circuiting switch 7. Dependent on the time adjustment of the time delay device 12, the switch 7 is again opened and closing of the control switch 16 can only then cause closing of the circuit breaker 4. On the other hand, it is impossible to close switch 7 as long as the circuit breaker 4 is closed. A positive interlock is thus provided between the circuit breaker 4 and the short-circuiting switch 7. After the circuit breaker 4 has been opened and the short-circuiting switch 7 has been closed, the time during which a backfire arc may be maintained is dependent only on the reactance of the transformer phase in which the current flows, which time is, as a rule, not more than .2 seconds.

The described system is available without change for the protection of a plurality of rectifiers supplied from separate transformers and delivering direct current to a common consuming device because a backfire in one rectifier simultaneously disconnects all the rectifiers on the alternating current side thereof and the consumer is short-circuited. The control circuits connecting the circuit breakers and the short-circuiting switches are so regulated that none of the circuit breakers can be closed to reconnect the source of alternating current before the short-circuiting switches are open.

Although but one embodiment of the present invention has been illustrated and described, it will be apparent that various changes and modifications may be made therein without departing from the spirit of the invention or from the scope of the appended claims.

The invention claimed is:

1. In an electric power rectifying system, a power circuit including a source of alternating current, a rectifier of the metallic vapor type, a transformer supplying said rectifier, a circuit breaker connecting said source of current and said transformer, said circuit breaker having an auxiliary contact member, and a direct current consuming device connected with said rectifier and with said transformer; and a control circuit including a short-circuiting switch for said current consuming device, said switch having an auxiliary contact member, a circuit for controlling opening of said circuit breaker, a circuit controlled by the auxiliary contact member of said circuit breaker for closing said switch, a circuit for controlling the closing of said circuit breaker, and a switch included in said last-mentioned circuit, said last-mentioned circuit being controlled by the auxiliary contact member of said switch and by said last-mentioned switch, said last-mentioned circuit being arranged to be closed only when said short-circuiting switch is opened.

2. In a system of electrical distribution, the combination with a vapor electric apparatus operative to supply direct current from a source of alternating current to a current consuming device against a counter electromotive force generated by said device, a circuit breaker operative to connect said source of alternating current with the said apparatus, and a switch operative to short circuit the said device, of means effective to prevent operation of the said circuit breaker to connect the said source with the said apparatus during the said short circuiting operation of the said switch.

3. In a system of electrical distribution, the combination with a vapor electric apparatus operative to supply direct current from a source of alternating current to a current consuming device against a counter electromotive force generated by said device, a transformer connected with said apparatus, a circuit breaker operative to connect the said source with the said transformer, and a switch operative to short circuit said device, of means operative to prevent operation of the said switch during connection operation of the said circuit breaker and effective to cause said short circuit operation of the said switch upon circuit opening operation of the said circuit breakers.

4. In a system of electrical distribution, the combination with a vapor electric apparatus operative to supply direct current from a source of alternating current to a current consuming device against a counter electromotive force generated by said device, a transformer connected with said apparatus, a circuit breaker, a coil operative upon energization thereof to effect operation of the said circuit breaker to connect the said transformer with the said source of alternating current, a coil supplied from said source and effective upon energization thereof to cause operation of the said circuit breaker to disconnect the said source from the said transformer, and a switch operative to short circuit the said device, of means operative responsive to circuit opening operation of the said switch to control energization of the second said coil.

5. In a system of electrical distribution, in combination with a vapor electric apparatus operative to supply direct current from a source of alternating current to a current consuming device against a counter electromotive force generated by said device, a transformer connected with said apparatus, an auxiliary source of current, a circuit breaker, a coil operative from said auxiliary source effective to cause actuation of the said circuit breaker to connect the said source of alternating current with the said transformer, a switch operative to short circuit the said device, and a coil operative from said auxiliary source effective to cause actuation of the said switch to short circuit the said device, of a time delay device operative to control the energization of the last said coil, means associated with said circuit breaker effective upon disconnection operation of the said circuit breaker to establish energizing circuits for last said coil and the last said device, and means associated with the said switch effective to control the energizing circuit for the first said coil.

6. In a system of electrical distribution, the combination with a vapor electric apparatus operative to supply a direct current from a source of alternating current to a current consuming device against a counter electromotive force generated by said device, a transformer connected with said apparatus, a circuit breaker operative to effect connection of said source of alternating current with the said transformer, and a switch operative to short circuit the said device, of means comprising auxiliary contact members of said circuit breaker effective upon disconnection operation of the said circuit breaker to cause actuation of the said switch, and means comprising auxiliary contact members of said switch effective upon contact opening actuation of the said switch to permit contact closing operation of the said circuit breaker to connect the said source of alternating current with the said transformer.

In testimony whereof I have hereunto subscribed my name this 21st day of April, A. D. 1930.

STEFAN WIDMER.